(12) United States Patent
McCord et al.

(10) Patent No.: US 8,510,229 B1
(45) Date of Patent: Aug. 13, 2013

(54) PROJECT EFFICIENCY ANALYSIS

(75) Inventors: Danial W. McCord, Overland Park, KS (US); Steven S. Stefan, Louisburg, KS (US); Brian M. Waddoups, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1706 days.

(21) Appl. No.: 11/669,936

(22) Filed: Jan. 31, 2007

(51) Int. Cl.
*G06Q 10/00* (2006.01)

(52) U.S. Cl.
USPC ......... 705/301; 705/7.38; 705/7.39; 705/7.41

(58) Field of Classification Search
None
See application file for complete search history.

(56) References Cited

U.S. PATENT DOCUMENTS

| | | | | |
|---|---|---|---|---|
| 5,381,332 | A * | 1/1995 | Wood | 705/7.25 |
| 5,907,490 | A * | 5/1999 | Oliver | 700/90 |
| 6,715,130 | B1 * | 3/2004 | Eiche et al. | 715/210 |
| 6,895,382 | B1 * | 5/2005 | Srinivasan et al. | 705/7.17 |
| 6,938,240 | B2 * | 8/2005 | Charisius et al. | 717/104 |
| 7,401,057 | B2 * | 7/2008 | Eder | 706/20 |
| 7,729,933 | B2 * | 6/2010 | Ye et al. | 705/7.11 |
| 7,743,369 | B1 * | 6/2010 | Srinivasan et al. | 717/155 |
| 7,752,065 | B2 * | 7/2010 | Buzz | 705/7.23 |
| 2002/0078432 | A1 * | 6/2002 | Charisius et al. | 717/102 |
| 2002/0194044 | A1 * | 12/2002 | Lablanc et al. | 705/8 |
| 2005/0071348 | A1 * | 3/2005 | Laicher et al. | 707/100 |
| 2006/0044307 | A1 * | 3/2006 | Song | 345/419 |
| 2006/0048151 | A1 * | 3/2006 | Haruta et al. | 718/100 |
| 2008/0082389 | A1 * | 4/2008 | Gura | 705/9 |
| 2008/0082956 | A1 * | 4/2008 | Gura et al. | 717/101 |
| 2008/0127041 | A1 * | 5/2008 | Gura | 717/101 |
| 2008/0163156 | A1 * | 7/2008 | Grey | 717/101 |

OTHER PUBLICATIONS

Fioravanti F (2001). Estimation and Prediction Metrics for Adaptive Maintenance Effot of Object-Oriented Systems. IEEE Transactions on Software Engineering 27(12): 1062-1083.*
Maxwell KD and Forselius (2000). Benchmarking Software Development Productivity. IEEE Software. Jan./Feb. 80-88.*
Fornaciari W, Micheli P, Salice F and Zamplella L (2003). A First Step Towards Hw/Sw Partitioning of UMP Specifications. Proceedings of the Design, Automation and Test in Europe Conference and Exhibition. 1-6.*
Antoniol G, Lokan C, Caldiera G and Fiutem R (1999). A Funtion Point-Like Measure for Object-Oriented Software. Empirical Software Engineering. 4: 263-287.*
Costagliola G. (2005). Class Point: An Approach for the Size Estiamtion of Object-Oriented Systems. IEEE Transactions on Software Engineering. 31(1): 52-74.*
Nesi P and Campanai M (1996). Metric Framework for Object-Oriented Real-OTime Systems Specification Languages. Journal of Systems Software. 34: 43-65.*
Uemura T, Kusumoto S and Inoue K (2001). Function-point analysis using design specifications based on the Unified Modelling Language. 13: 223-243.*

(Continued)

*Primary Examiner* — Brett Feeney

(57) ABSTRACT

A method for analyzing project efficiency is provided. For a plurality of projects, a weight is assigned to each of a set of deliverables. The weight is associated with each of the deliverables for each of the plurality of projects. A status of each deliverable of a set of deliverables is determined for a project, where the status indicates that the deliverable has at least been started. A weight associated with each deliverable is used to generate an earned value. The earned value and an actual cost of the project are used to calculate an efficiency.

20 Claims, 4 Drawing Sheets

(56) References Cited

OTHER PUBLICATIONS

Smith J (2003). The Estimation of Effort Based on Use Cases. IBM-Rational Software. 1-18.*

Abran A and Robillard PN (1996). Function Points Analysis: An Empirical Study of Its Measurement Processes. IEEE Transactions on Software Engineering. 22(12): 895-910.*

* cited by examiner

FIG. 2

Graphic User Interface 202

First Project Data 106

| Deliverables 204 | Corresponding Weight 224 | Start Weight 226 | End Weight 228 |
|---|---|---|---|
| Investigative Approval 206 | 5 | 2.5 | 2.5 |
| Functional Requirements 208 | 10 | 5 | 5 |
| System Requirements 210 | 10 | 5 | 0 |
| Design Specification 212 | 15 | 7.5 | 7.5 |
| Development Approval 214 | 5 | 0 | 0 |
| Coding 216 | 30 | 0 | 0 |
| Testing 218 | 20 | 0 | 0 |
| Deployment 220 | 5 | 0 | 0 |
| First Earned Value 118 / Deliverable Schedule Metric 230 | | | 20 |
| First Current Cost 112 / Schedule Measure 232 | | | 25 |
| First Efficiency 124 / Schedule Efficiency 234 | | | 80.0 |
| Budgeted Cost 236 / Scheduled Project Completion 240 | | | $1,000,000 |
| End State 238 / Project Completion Schedule 242 | | | $1,250,000 |

Trip Point 222

PROJECT EFFICIENCY ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Many enterprises use project analysis tools and methods to ensure that their projects are completed on time and within budgetary limits. Some project analysis tools track the amount of money spent on a project or the number of hours worked on the project to measure the degree of project completion. However, just because a project manager has already spent half of an allocated budget for a project does not mean that half of the work required for the project has also been completed. If a project manager can compare the amount of work produced for the project against the amount of budget consumed by the project, the project manager can take appropriate corrective actions to address project inefficiencies in an attempt to complete the project on time and within the budget limits.

One project analysis method includes the use of a project plan in which a project manager identifies each executable step planned for the project and assigns an earned value, the value of work done for the project, to each identified step. However, such project analysis methods often prove to be so time-consuming and inefficient that many project managers do not even consider implementing these methods.

SUMMARY OF THE INVENTION

In one embodiment, the present disclosure provides a method for analyzing project efficiency. For a plurality of projects, a weight is assigned to each of a set of deliverables. The assigned weight is applied to the deliverables for each of the plurality of projects. A status of each deliverable of a set of deliverables is determined for a project, where the status indicates that the deliverable has at least been started. A weight associated with each deliverable is used to generate an earned value. The earned value is output by an output device. The earned value and an actual cost of the project are used to calculate an efficiency.

In another embodiment, a system for analyzing the efficiency of a project is provided. The system includes a storage device, a processor, and instructions stored in the storage device. When executed by the processor, the instructions perform a method, where a weight is assigned to each of a set of deliverables for a plurality of projects. The weight is to be associated with each of the deliverables for each of the plurality of projects. A status of each deliverable of a set of deliverables is determined for a project, where the status indicates that the deliverable has at least been started. A weight associated with each deliverable is used to generate an earned value. The earned value and an actual cost of the project are used to calculate an efficiency.

In other embodiments, a method is provided for analyzing project efficiency. For a plurality of projects, a weight is assigned to each of a set of deliverables, the weight to be associated with each of the deliverables for each of the plurality of projects. A status of each deliverable of a set of deliverables is determined for a project, where the status indicates that the deliverable has at least been started. A weight associated with each deliverable is used to generate a deliverable schedule metric. The deliverable schedule metric and a schedule measure for the project are used to calculate a schedule efficiency.

These and other features and advantages will be more clearly understood from the following detailed description taken in conjunction with the accompanying drawings and claims.

BRIEF DESCRIPTION OF THE DRAWINGS

These and other features will be more clearly understood from the following detailed description taken in conjunction with the accompanying drawings and claims.

FIG. 2 is a block diagram of a graphic user interface for project efficiency analysis according to some embodiments of the present disclosure.

DETAILED DESCRIPTION OF THE PREFERRED EMBODIMENTS

Figure 1:
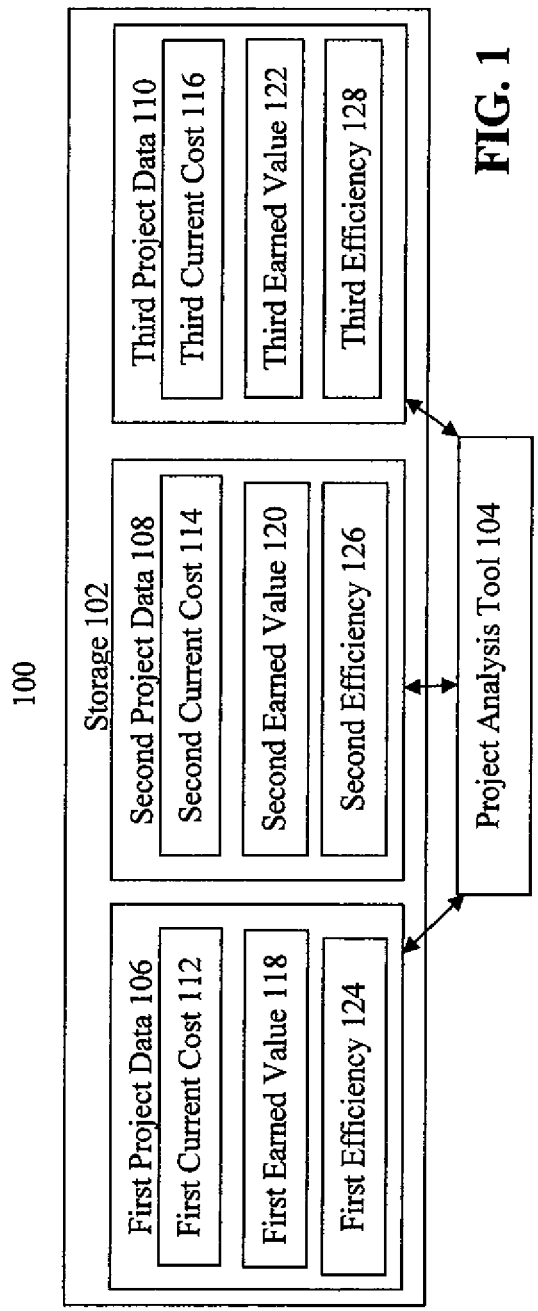
FIG. 1 is a diagram of a project efficiency analysis system according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various methods and systems of project efficiency analysis. Instead of a project analysis tool assigning weights to hundreds of steps for one project and repeating the process for other projects, the project analysis tool assigns weights to a small number of deliverables. The weights and deliverables can be used for multiple projects without the need for a project manager to change deliverables or weights for each project. For example, a software development project manager can use the same weights and deliverables for each software development project without having to determine a different list of deliverables and different assigned weights for each different software development project. A deliverable is a physical output or result that is created as a result of work on a project. Deliverables include work products, for example the intended results of project work. Deliverables also include management products, such as documents used to manage the project. Even if many steps are added or subtracted from a project plan, each deliverable remains unchanged.

A project analysis tool, according to an embodiment of this disclosure, determines the status of each deliverable for each project. The status indicates whether work has started for each deliverable in the project. In some embodiments, the project analysis tool also determines if work has ended for each deliverable in the project. The project analysis tool uses a weight associated with each deliverable to generate an earned value. The weights can be reevaluated periodically to insure that the weights are accurate measures of the work produced by the deliverables. The project analysis tool can divide the earned value by the actual cost of the project to calculate a project efficiency. The project analysis tool can divide a total budget cost for the project by the project efficiency to predict an end of state for the project, such as an estimate of the total budget cost if the work on the project continues at the current efficiency. In some embodiments, different types of projects or projects on different development tracks might each have their own standard set of weights for their deliverables.

In some embodiments, instead of generating earned value, the project analysis tool generates a deliverable schedule metric, which is a measure of the project schedule based on the work done for the project. The project analysis tool can divide the deliverable schedule metric by a schedule measure for the project to calculate a schedule efficiency. The project analysis tool can divide a scheduled project completion time by the schedule efficiency to predict a project completion schedule. The project completion schedule describes when the work on the project will complete if work on the project continues at the current schedule efficiency.

Turning now to FIG. 1, a project efficiency analysis system 100 is depicted. The system 100 can generate an earned value for each of a number of projects and calculate the efficiency for each project. In some embodiments, the system 100 can generate a deliverable schedule metric for each of a number of projects and calculate a schedule efficiency for each project. The system 100 includes a storage 102 and a project analysis tool 104. The storage 102 contains project data, such as first project data 106, second project data 108, and third project data 110. The number of projects and the types of data for each project are exemplary and the storage 102 can include data for any number of projects and the project analysis tool 104 can calculate other types of data.

The data for each project can include a current cost for the project, the amount of money already spent upon the project, such as a first current cost 112, a second current cost 114, and a third current cost 116. The data for each project can also include an earned value for the project. The earned value is based on a calculation by the project analysis tool 104 of the value already produced for the project, such as a first earned value 118, a second earned value 120, and a third earned value 122. Additionally, the data for each project includes an efficiency for the project, such as a first efficiency 124, a second efficiency 126, and a third efficiency 128, which can be based on a comparison by the project analysis tool 104 between the current cost of the project and the earned value of the project.

In some embodiments, the data for each project includes a schedule measure for the project, the current point in a project schedule. The current point in the project schedule is based on the value of the work done for the project and is a time equivalent to the current cost. The data for each project can also include a deliverable schedule metric for the project based on a calculation by the project analysis tool 104 of the current point in the project schedule. The deliverable schedule metric is a time equivalent to earned value. The efficiency for the project can be based on a comparison by the project analysis tool 104 between the schedule measure of the project and the deliverable schedule metric of the project. All of the project data can be displayed to the user of the project analysis tool 104.

Turning now to FIG. 2, a graphic user interface (GUI) 202 for project efficiency analysis is depicted according to some embodiments of the present disclosure. The GUI might contain selectable boxes or similar components corresponding to the data depicted in FIG. 2. A user might manually enter assessments into the boxes. Alternatively, the boxes might contain drop-down lists or similar components that allow a user to select assessments from predefined lists. The GUI might contain a component that automatically calculates weighted scores using the assessments entered or selected by the user. Alternatively, a text-based data entry system might be used for entry of information. An automated calculation system might again be present to calculate an earned value, or a deliverable schedule metric, and an efficiency based on the data entered.

For example, the graphic user interface 202 displays the first project data 106. The first project data 106 includes a table of deliverables 204, such as investigative approval 206, functional requirements 208, system requirements 210, design specification 212, development approval 214, coding 216, testing 218, and deployment 220. For example, the functional requirements 208 is a document used to manage the functional requirements for a software development project and the coding 216 is one intended result of work for the software development project, such as any coding or programming related to the project. The first project data 106 also includes a trip point 222. The trip point 222 is depicted as a point in the project schedule after the design specification 212 deliverable, but the trip point 222 can occur at any point in the project schedule. Additionally, the trip point 222 can also be a calendar date, an amount of budget cost consumed, or any other periodic occurrence.

The deliverables 204 depicted in FIG. 2 are the same deliverables that are used for each software development project, but the graphic user interface 202 can display deliverables for other types of projects. For example, the deliverables 204 for an enterprise services project replaces coding 216 with an execution deliverable and replaces testing 218 with a validation deliverable.

Each of the deliverables 204 is assigned a corresponding weight 224. The weight for each deliverable can be based on a calculation of how much value of a project is earned by completion of the deliverable. Alternatively, the weight for each deliverable can be based on a calculation of how much schedule time for a project should be consumed by completion of the deliverable. For example, because evaluations have determined that five percent of the value for a software development project is earned by the completion of the document for the investigative approval 206, the weight in the corresponding weight 224 column corresponding to investigative approval 206 row is 5.

The corresponding weight 224 for each deliverable can be divided into two components, a start weight 226 and an end weight 228. This division of the corresponding weight 224 is based on the assignment of part of the corresponding weight 224 for a deliverable when the status of the deliverable is "start" and the assignment of the remainder of the corresponding weight 224 for the deliverable when the status of the deliverable is "end." For example, the corresponding weight 224 of 5 for the investigative approval 206 is divided into two components, the start weight 226 of 2.5 and the end weight 228 of 2.5, because two and a half percent is an estimate of the value for any project earned by the start of the document for the investigative approval 206 with the remaining two and a half percent of the value for the project earned by the completion of the document for the investigative approval 206. Other embodiments may include more milestone weights beyond only a start milestone and an end milestone (i.e., a start milestone, a second milestone, a third milestone, and an end milestone). Further, other embodiments may divide the weights by other amounts (i.e., ¼ of the corresponding weight 224 for the start milestone and ¾ for the end milestone).

The first project data 106 can include the first earned value 118, which the project analysis tool 104 can generate as a measure of the value for work done for the first project. In an example not depicted in FIG. 2, the statuses of the deliverables 204 indicate that the deliverables have been started for the investigative approval 206, the functional requirements 208, and the system requirements 210, and the statuses of the deliverables 204 indicate that no other deliverables have been started. In this example, the corresponding weight 224 for the deliverables 204 that have at least been started is 5 for the investigative approval 206, 10 for the functional requirements 208, and 10 for the system requirements 210. Continuing this example, the project analysis tool 104 adds 5 for the investigative approval 206, 10 for the functional requirements 208, and 10 for the system requirements 210 to result in 25 for the first earned value 118 of the first project.

The corresponding weight 224 for each deliverable can be divided into two components, the start weight 226 and the end weight 228, as a measure of the value for work done for a project. In an example depicted in FIG. 2, the statuses of the deliverables 204 indicate that the deliverables have been started and ended for the investigative approval 206 and the functional requirements 208, the deliverable has only started for the system requirements 210, and the statuses of the deliverables 204 indicate that no other deliverables have been started or ended. In this example, the start weight 226 for the deliverables 204 that have been started is 2.5 for the investigative approval 206, 5 for the functional requirements 208, and 5 for the system requirements 210. Continuing this example, the end weight 228 for the deliverables 204 that have been ended is 2.5 for the investigative approval 206 and 5 for the functional requirements 208. Completing this example, the project analysis tool 104 adds 2.5 for the start weight 226 of the investigative approval 206, 2.5 for the end weight 228 of the investigative approval 206, 5 for the start weight 226 of the functional requirements 208, 5 for the end weight 228 of the functional requirements 208, and 5 for the start weight 226 of the system requirements 210 to result in 20 for the first earned value 118 of the first project.

In contrast to the result of 25 previously discussed for calculating the first earned value 118 for the first project, the current example result of 20 for the first earned value 118 generated for the first project is more accurate. The greater accuracy is because the generation of earned value using the start weight 226 and the end weight 228 takes into account whether a deliverable has both started and ended, not just whether a deliverable has been started. In some embodiments, the greater accuracy may come with the additional cost of tracking and recording a greater number of datapoints, which may increase complexity and decrease administrative efficiency.

In other embodiments, the first project data 106 includes a deliverable schedule metric 230, which is a time equivalent to earned value. The project analysis tool 104 generates the deliverable schedule metric 230 as a measure of the current point in the project schedule based on the value for work done for a project. The corresponding weight 224 for each of the deliverables 204 used in generating the deliverable schedule metric can be similar to or different from the corresponding weight 224 used for each of the deliverables 204 used in generating earned value.

For example, the amount of time required in a project schedule for completing the document for the functional requirements 208 can be 15, rather than 10, because completing the document for the functional requirements 208 is disproportionally time intensive compared to the earned value produced by completing document for the functional requirements 208. Additionally, the corresponding weight 224 for each deliverable can be divided into two components, the start weight 226 and the end weight 228, as a measure of the current point in the project schedule based on the value for work done for the project. For example, the start weight 226 for the functional requirements 208 can be 7.5 while the end weight 228 for the functional requirements can be the remaining 7.5

The first project data 106 can display the first current cost 112, which can be used to calculate the first efficiency 124 for the first project. The first current cost 112 can be expressed as the percentage of budgeted funds spent on the first project, where the budgeted funds spent on the first project may be actual funds or can be based on the budgeted hours spent on the first project. In this example, the first current cost 112 for the first project is 25, which means that 25 percent of the budgeted funds or hours have been spent on the first project.

In other embodiments, the first project data 106 can display a schedule measure 232, which is used to calculate a schedule efficiency 234 for the first project. The schedule measure 232 can be expressed as the percentage of time schedule spent on the first project. For example, if the schedule measure for the first project is 25, then 25 percent of the budgeted time has been spent on the first project.

The project analysis tool 104 can calculate the efficiency by dividing the earned value by the current cost. For example, the first earned value 118 of 20 is divided by the first current cost 112 of 25 to produce the first efficiency 124 of 80.0%. The project analysis tool 104 can divide a budget cost 236 for the project by the first efficiency 124 to calculate an end state 238 for the project. The end state 238 is an estimate of the total budget cost if the work on the project continues at the current first efficiency 124. For example, the budget cost 236 of $1,000,000 for the project is divided by the first efficiency 124 of 80.0% to calculate an end state 238 of $1,250,000 for the project.

In other embodiments, the project analysis tool 104 can calculate the schedule efficiency 234 by dividing the deliverable schedule metric 230 by the schedule measure 232. The project analysis tool 104 can divide a scheduled project completion 240 by the schedule efficiency 234 to calculate a project completion schedule 242 for the project. The project completion schedule 242 describes when the work on the project will complete if work on the project continues at the current schedule efficiency 234.

Figure 3:
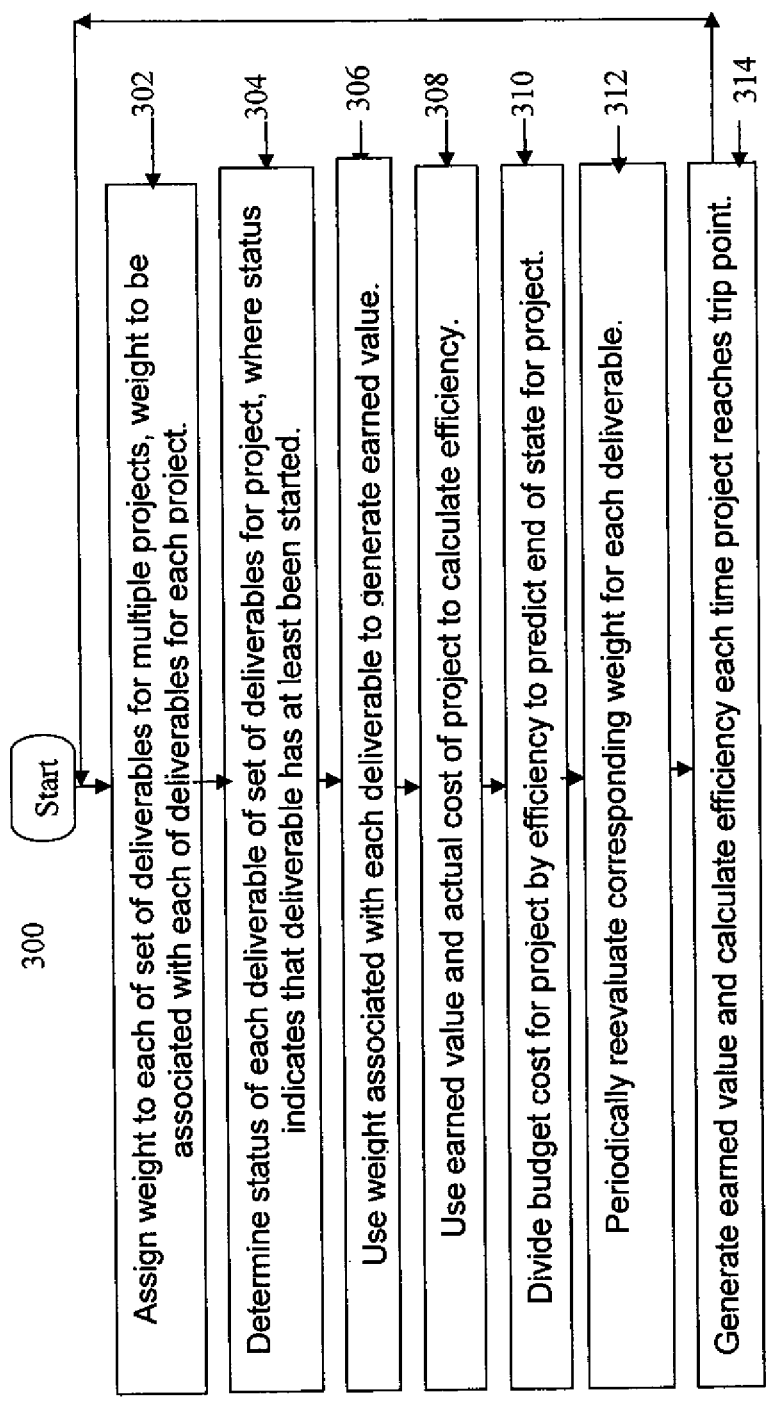
FIG. 3 is a flowchart of a method that might be used to analyze project efficiency according to some embodiments of the present disclosure.

An illustrative method for project efficiency analysis is depicted in FIG. 3. The project analysis tool 104 can execute the method to calculate project efficiency and to make predictions for a project based on the calculated project efficiency.

In box 302, the project analysis tool 104 assigns a weight to each of a set of deliverables for multiple projects, the weight to be associated with each of the deliverables for each of the projects. For example, the project analysis tool 104 assigns the corresponding weight 222 for each of the deliverables 204, such as assigning the corresponding weight 222 of 5 to the investigative approval 206. The project analysis tool 104 can assign the same corresponding weight 222 for the same deliverables 204 for each project defined as a type of project, such as a software development project.

In box 304, the project analysis tool 104 determines a status of each deliverable of the set of deliverables for the project, where the status indicates that the deliverable has at least been started. For example, the project analysis tool 104 can display the first project data 106 on the graphic user interface 202 to prompt a user to enter assessments for the status of each of the deliverables 204. Continuing this example, the user can enter an assessment for the status of the systems requirements 210 as a deliverable that has been started, and a deliverable that has not ended. The project analysis tool 104 stores the entered status of each of the deliverables 204 for the project.

In box 306, the project analysis tool 104 uses the weight associated with each deliverable to generate an earned value. For example, the project analysis tool 104 uses the corresponding weight 222 for the stored status of each of the deliverables 204 to generate the first earned value 118. Continuing this example, the project analysis tool 104 has determined that the stored statuses indicate that only the first three deliverables listed in FIG. 2 have been started, and the stored statuses indicate that only the first two deliverables listed in FIG. 2 have ended. Therefore, the project analysis tool 104 adds the start weight 224 for each of the deliverables that has a status of started to the end weight 226 for each of the deliverables that has a status of ended to produce 20 (2.5+2.5+5+5+5) as the first earned value 118 in FIG. 2.

In other embodiments, the project analysis tool 104 uses the weight associated with each deliverables to generate the deliverable schedule metric 230. For example, the project analysis tool 104 uses the corresponding weight 222 for the stored status of each of the deliverables 204 to generate the deliverable schedule metric 230. Continuing this example, the project analysis tool 104 has determined that the stored statuses indicate that only the first three deliverables listed in FIG. 2 have been started, and the stored statuses indicate that only the first two deliverables listed in FIG. 2 have ended. Therefore, the project analysis tool 104 adds the start weight 224 for each of the deliverables that has a status of started to the end weight 226 for each of the deliverables that has a status of ended to produce the deliverable schedule metric 230.

In box 308, the project analysis tool 104 uses the earned value and the actual cost of the project to calculate an efficiency. For example, the project analysis tool 104 divides the first earned value 118 of 20 by the first current cost 112 of 25 to produce the first efficiency 124 of 80.0. In some other embodiments, the project analysis tool 104 divides the deliverable schedule metric 230 by the schedule measure 232 of the project to produce the schedule efficiency 234.

In box 310, the project analysis tool 104 divides the budget cost for the project by the efficiency to predict an end of state for the project. For example, the project analysis tool 104 divides the budgeted cost 236 of $1,000,000 for the first project by the first efficiency 124 of 80.0% to produce a predicted end state 238 of $1,250,000 for the first project. The project manager for the first project can recommend corrective actions that are proportional to the predicted budget overrun of $250,000.

In other embodiments, the project analysis tool 104 divides the scheduled project completion 240 by the schedule efficiency 234 to predict a project completion schedule 242. In an example not depicted in FIG. 2, the project analysis tool 104 divides the scheduled project completion 240 of 32 weeks for the first project by the schedule efficiency 234 of 80.0% to produce a project completion schedule 242 of 40 weeks for the first project. The project manager of the first project can recommend corrective actions that are proportional to the predicted schedule overrun of 8 weeks.

In box 312, the project analysis tool 104 periodically reevaluates the corresponding weight for each deliverable. For example, at the end of every three months the project analysis tool 104 accumulates project data of recently completed projects to evaluate whether the corresponding weight 222 for each of the deliverables 204 is still an accurate measure for each of the deliverables 204. Continuing this example, if after three months the project analysis tool 104 reevaluates the corresponding weight 222 for coding 216 is 30.5 instead of 30 and the corresponding weight for testing 218 is 19.5 instead of 20, the project analysis tool 104 continues to use the corresponding weight 222 previously stored for each of the deliverables 204. In contrast, if after one year of the project, the project analysis tool 104 reevaluates the corresponding weight 222 for coding 216 is 34.5 instead of 30 and the corresponding weight for testing 218 is 15.5 instead of 20, the project analysis tool 104 can substitute in an appropriately revised corresponding weight 222 for each of these deliverables.

In box 314, the project analysis tool 104 generates the earned value and calculates the efficiency each time the project reaches a trip point. For example, at the end of each month the project analysis tool 104 generates the first earned value 118, calculates the first efficiency 124, and predicts the end state 238 for the first project. The project analysis tool 104 can be executed for a project when a trip point is reached based on a calendar date, a point in a project schedule, an amount of budget cost consumed, or any other periodic occurrence.

In other embodiments, the project analysis tool 104 generates the deliverable schedule metric 230 and calculates the schedule efficiency 234 each time the project reaches a trip point. For example, at the end of each three months the project analysis tool 104 generates the deliverable schedule metric 230, calculates the schedule efficiency 234, and predicts the project completion schedule 242 for the first project.

Figure 4:
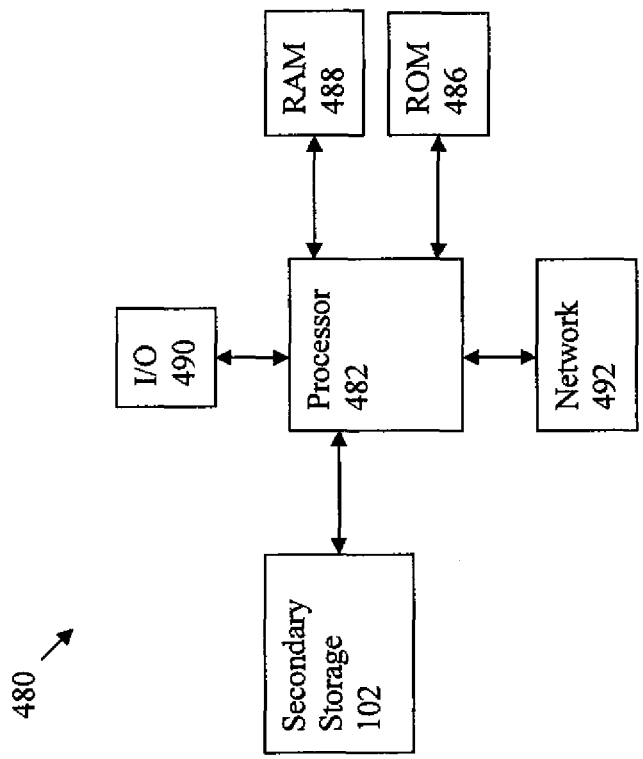
FIG. 4 is a block diagram of a computer system operable for some of the various embodiments of the present disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 102, read only memory (ROM) 486, random access memory (RAM) 488, input/output (I/O) 490 devices, and network connectivity devices 492. The processor may be implemented as one or more CPU chips.

The secondary storage 102 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O 490 devices may include printers, video monitors, liquid crystal displays (LCDs), touch screen displays, keyboards, keypads, switches, dials, mice, track balls, voice recognizers, card readers, paper tape readers, or other well-known input devices, such as the graphic user interface 202. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 492 devices may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity 492 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. Such computer programs may enable the use of the project analysis tool 104.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for analyzing project efficiency, comprising:
   identifying a set of deliverables common to a plurality of completed projects;
   determining a weight for each deliverable of the set of deliverables based on an evaluation of accumulated project data for the plurality of completed projects, wherein the weight comprises a measure of the value of a project earned by completion of a deliverable of the set of deliverables;
   assigning the set of deliverables and the weight for each deliverable to a plurality of projects;
   determining a status of each deliverable of the set of deliverables for a project of the plurality of projects, where the status indicates that the deliverable has at least been started;
   computing, by one or more computers, an earned value for the project using the weight associated with each deliverable that has at least been started;
   calculating, by the one or more computers, a current cost for the project based on an amount of budgeted funds spent on the project, where the budgeted funds spent on the project is calculated based on at least one of actual funds and budgeted hours;
   calculating a project efficiency by dividing the earned value by the current cost;
   calculating an end of state cost by dividing a budget cost for the project by the project efficiency; and
   outputting, by an output device, at least one of the earned value, the current cost, the project efficiency, and the end of state cost.

2. The method of claim 1, wherein determining the weight for each deliverable comprises at least one of:
   determining at least some different weights for different deliverables;
   determining at least some of the same weights for different deliverables; and
   determining some deliverables the same weights and some deliverables different weights.

3. The method of claim 1, wherein the current cost of the project is defined as a percentage of the actual cost of the project.

4. The method of claim 1, wherein the status of at least started includes deliverables that have been started and deliverables that have been both started and ended.

5. The method of claim 1, wherein the current cost is further defined as a cost to date for the project.

6. The method of claim 1, wherein the weight used to generate the earned value is further defined as using the weight associated with the deliverable when the deliverable has been started and ended and using only half of the weight associated with the deliverable when the deliverable is only started.

7. The method of claim 1, further comprising computing the earned value and calculating the efficiency each time a project reaches a trip point.

8. The method of claim 1, further comprising periodically reevaluating the corresponding weight for each deliverable.

9. The method of claim 1, wherein the deliverables include at least one of investigative approval, functional requirements, system requirements, a design specification, development approval, coding, testing, and deployment.

10. The method of claim 1, wherein the deliverables include at least one of investigative approval, functional requirements, system requirements, a design specification, development approval, execution, validation, and deployment.

11. A system for analyzing the efficiency of a project, comprising:
a storage device;
a processor; and
instructions stored in the storage device and operable such that the instructions when executed by the processor perform a method including:
identifying a set of deliverables common to a plurality of completed projects;
determining a weight for each deliverable of the set of deliverables based on a portion of a project earned by completion of a corresponding deliverable from the set of deliverables and an evaluation of accumulated project data for the plurality of completed projects;
assigning the set of deliverables and the weight for each deliverable to a plurality of projects;
determining a status of each deliverable of the set of deliverables for a project of the plurality of projects, where the status indicates that the deliverable has at least been started,
computing an earned value for the project using the weight associated with each deliverable that has at least been started;
calculating, by one or more computers, a current cost for the project based on an amount of budgeted funds spent on the project, where the budgeted funds spent on the project is calculated based on at least one of actual funds and budgeted hours;
calculating a project efficiency by dividing the earned value by the current cost of the project; and
calculating an end of state cost by dividing a budget cost for the project by the project efficiency.

12. The system of claim 11, wherein the current cost of the project is defined as a percentage of the actual cost of the project.

13. The system of claim 11, wherein the status of at least started includes deliverables that have been started and deliverables that have been both started and ended.

14. The system of claim 13, wherein the weight used to generate the earned value is further defined as using the weight associated with the deliverable when the deliverable has been started and ended and using only half of the weight associated with the deliverable when the deliverable is only started.

15. The system of claim 13, wherein using the weight associated with each deliverable comprises using a part of the assigned weight when the deliverable begins and using a remaining part of the corresponding weight when the deliverable ends.

16. The system of claim 11, further comprising computing the earned value and calculating the efficiency each time a project reaches a trip point.

17. The system of claim 11, further comprising periodically reevaluating the corresponding weight for each deliverable.

18. The system of claim 11, wherein the deliverables include at least one of investigative approval, functional requirements, system requirements, a design specification, development approval, coding, testing, and deployment.

19. The system of claim 11, wherein the deliverables include at least one of investigative approval, functional requirements, system requirements, a design specification, development approval, execution, validation, and deployment.

20. The system of claim 11, wherein the current cost is further defined as a cost to date for the project.

* * * * *